United States Patent
Yoneima

(10) Patent No.: US 9,387,689 B2
(45) Date of Patent: Jul. 12, 2016

(54) OPTICAL SCANNING DEVICE AND METHOD FOR ADJUSTING POSITION OF LIGHT BEAM SENSOR

(71) Applicant: KYOCERA Document Solutions Inc., Osaka (JP)

(72) Inventor: Yoshinobu Yoneima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/316,283

(22) Filed: Jun. 26, 2014

(65) Prior Publication Data

US 2015/0002601 A1    Jan. 1, 2015

(30) Foreign Application Priority Data

Jun. 28, 2013    (JP) ................. 2013-136025

(51) Int. Cl.
| | |
|---|---|
| *B41J 15/14* | (2006.01) |
| *B41J 2/47* | (2006.01) |
| *G06K 15/12* | (2006.01) |
| *G02B 26/12* | (2006.01) |

(52) U.S. Cl.
CPC ........ *B41J 2/471* (2013.01); *B41J 2/473* (2013.01); *G02B 26/127* (2013.01); *G06K 15/1219* (2013.01)

(58) Field of Classification Search
CPC ............ H04N 2201/0471; H04N 2201/04729; H04N 2201/04748; H04N 2201/04786; H04N 2201/04789
USPC ......... 347/229, 230, 234, 235, 241–244, 246, 347/247, 256–261
See application file for complete search history.

(56) References Cited

U.S. PATENT DOCUMENTS

| | | | | | |
|---|---|---|---|---|---|
| 4,847,492 | A | * | 7/1989 | Houki | ........................ 359/217.1 |
| 4,914,294 | A | * | 4/1990 | Fukai et al. | .................... 250/585 |
| 4,918,306 | A | * | 4/1990 | Saito | ...................... G02B 26/10 250/235 |
| 5,394,173 | A | * | 2/1995 | Kubota | ......................... 347/257 |
| 5,475,414 | A | * | 12/1995 | Isaka et al. | ..................... 347/129 |
| 5,627,671 | A | * | 5/1997 | Yamura et al. | ................ 359/232 |
| 6,933,957 | B2 | * | 8/2005 | Omori | .................. G03G 15/305 347/249 |

(Continued)

FOREIGN PATENT DOCUMENTS

| | | |
|---|---|---|
| JP | S63-136017 A | 6/1988 |
| JP | H10-104536 A | 4/1998 |

(Continued)

OTHER PUBLICATIONS

An Office Action; "Notice of Reasons for Rejection," issued by the Japanese Patent Office on Aug. 18, 2015, which corresponds to Japanese Patent Application No. 2013-136025 and is related to U.S. Appl. No. 14/316,283.

*Primary Examiner* — An Do
(74) *Attorney, Agent, or Firm* — Studebaker & Bracett PC

(57) ABSTRACT

An optical scanning device includes a light source, a deflector, a scanning optical system, a BD sensor, and a half-silvered mirror. The light source emits a light beam. The deflector deflects a light beam emitted from the light source. The scanning optical system includes a scan lens and causes the deflected light beam to form an image on a photosensitive surface. The BD sensor detects a light beam. The half-silvered mirror splits the light beam into a first beam and a second beam. The first beam passes through the scan lens to enter the photosensitive surface. The second beam enters the BD sensor.

9 Claims, 7 Drawing Sheets

(56) References Cited

U.S. PATENT DOCUMENTS

| | | | |
|---|---|---|---|
| 7,119,824 B2 * | 10/2006 | Ishibe | 347/235 |
| 7,333,254 B2 | 2/2008 | Amada et al. | |
| 7,643,046 B2 * | 1/2010 | Imai et al. | 347/234 |
| 7,663,785 B2 * | 2/2010 | Kim | 358/481 |
| 7,706,040 B2 | 4/2010 | Amada et al. | |
| 7,715,075 B2 | 5/2010 | Kuribayashi | |
| 8,228,580 B2 * | 7/2012 | Arai et al. | 359/204.1 |
| 2004/0032631 A1 | 2/2004 | Amada et al. | |
| 2004/0125199 A1 | 7/2004 | Omori et al. | |
| 2008/0117487 A1 | 5/2008 | Amada et al. | |
| 2009/0051996 A1 | 2/2009 | Kuribayashi | |
| 2012/0134001 A1 * | 5/2012 | Yoshida | 359/205.1 |

FOREIGN PATENT DOCUMENTS

| | | |
|---|---|---|
| JP | 2004-184527 A | 7/2004 |
| JP | 2005-053095 A | 3/2005 |

\* cited by examiner

OPTICAL SCANNING DEVICE AND METHOD FOR ADJUSTING POSITION OF LIGHT BEAM SENSOR

INCORPORATION BY REFERENCE

The present application claims priority under 35 U.S.C. §119 to Japanese Patent Application No. 2013-136025, filed Jun. 28, 2013. The contents of this application are incorporated herein by reference in their entirety.

BACKGROUND

The present disclosure relates to an optical scanning device and a method for adjusting the position of a light beam sensor.

An electrophotographic image forming apparatus (such as a copier or a laser printer) operates as follows. A charger charges the photosensitive surface of a photosensitive member, and an exposure device exposes the charged photosensitive surface to light. Consequently, a latent image conforming to image data is formed on the photosensitive surface. A developing device visualizes the latent image by developing it into a toner image. Then, a transfer device transfers the toner image to paper. Further, a fixing device applies heat and pressure to the toner image to fuse and fix the toner image on the paper.

An image forming apparatus employs an optical scanning device as the device that exposes the photosensitive surface of the photosensitive member to light. The optical scanning device scans the photosensitive surface of the photosensitive member with a light beam to write image data on the photosensitive surface.

SUMMARY

A first aspect of the present disclosure is directed to an optical scanning device for scanning a target surface with a light beam to write image data on the target surface. The optical scanning device includes: a light source that emits the light beam, a deflector that deflects the emitted light beam; a scanning optical system that includes one or more scan lenses and causes the deflected light beam to form an image on the target surface; a light beam sensor that detects the light beam; and a light beam guide that splits the light beam into a first beam and a second beam. The light beam guide guides the first beam and the second beam so that the first beam passes through at least one of the one or more scan lenses to enter the target surface and the second beam enters the light beam sensor.

A second aspect of the present disclosure is directed to a method for adjusting a position of a light beam sensor included in an optical scanning device that scans a target surface with a light beam emitted from a light source to write image data on the target surface. The method involves: preparing a jig at a position coinciding with where the target surface is to be placed, the jig including a sensor mounting section at a reference position where a first beam is to enter, the first beam and a second beam being split from the light beam such that the first beam passes through one or more scan lenses and the second beam enters the light beam sensor; mounting a reference sensor to the sensor mounting section, the reference sensor being configured to detect the first beam; and adjusting the position of the light beam sensor so as to synchronize detection timing of the second beam by the light beam sensor with detection timing of the first beam by the reference sensor.

DETAILED DESCRIPTION

Figure 1:
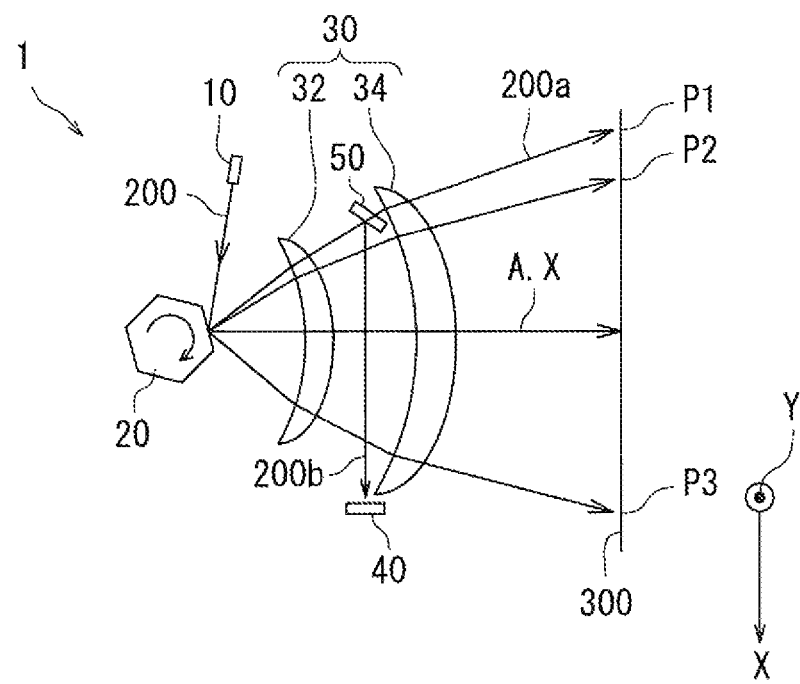
FIG. 1 is a schematic diagram of an optical scanning device according to a first embodiment of the present disclosure.

The following describes embodiments of the present disclosure with reference to the accompanying drawings. FIG. 1 is a schematic diagram of an optical scanning device according a first embodiment of the present disclosure.

An optical scanning device 1 shown in FIG. 1 is employed in an image forming apparatus (a copier or a printer) to write image data on a photosensitive surface 300 of a photosensitive drum. The photosensitive surface 300 is a target surface to be scanned.

The optical scanning device 1 includes a light source 10, a polygon mirror 20 being a deflector, a scanning optical system 30, a beam detect (BD) sensor 40 being a light beam sensor, and a half-silvered mirror 50 being a light beam guide.

The light source 10 is constructed from a laser diode or the like and emits laser light modulated according to image data.

The polygon minor 20 has a shape of a polygonal plate in a plan view and has a plurality of reflecting surfaces on the periphery. The polygon mirror 20 is rotated clockwise by a motor (not shown).

The scanning optical system 30 includes scan lenses 32 and 34 being a first scan lens and a second scan lens, respectively. The scan lenses 32 and 34 together constitute an fθ lens and each of which may be a spherical lens, a toroidal lens, or a non-spherical lens, for example. For example, the scan lens 32 has positive power in the main scanning direction and negative power in the sub-scanning direction. For example, the scan lens 34 has positive power in the main scanning direction and positive power in the sub-scanning direction.

The half-silvered minor 50 splits part of a light beam 200 having passed through the scan lens 32 into a first beam 200a and a second beam 200b. The first beam 200a passes through the half-silvered mirror 50 and then enters the scan lens 34 to form an image on the photosensitive surface 300. On the other hand, the second beam 200b is reflected by the half-silvered mirror 50 and then passes between the scan lenses 32 and 34 to enter the BD sensor 40.

The BD sensor 40 detects the second beam 200b. The BD sensor 40 is secured to a support member (not shown) formed of metal, synthetic resin, or the like. The support member is secured to a casing (not shown) of the optical scanning device 1 with a screw. The support member has a slot for insertion of the shaft of the screw. By loosening the screw, the support member can be moved in the longitudinal direction of the slot.

The light beam 200 emitted from the light source 10 is deflected by the polygon minor 20 to enter the scan lens 32. After passing through the scan lens 32, the light beam 200 enters and passes through the scan lens 34 to form a spot image on the photosensitive surface 300. As the polygon minor 20 rotates, the spot image formed by the light beam 200 on the surface of the photosensitive surface 300 moves in the main scanning direction (X-axis direction). As a consequence, image data is written to the photosensitive surface 300.

Part of the light beam 200 enters the half-silvered mirror 50 to be split into the first beam 200a and the second beam 200b. The first beam 200a passes through the half-silvered mirror 50 and then enters and passes through the scan lens 34 to form an image on the photosensitive surface 300. On condition that the light beam 200 is not deviated from the reference for determining the write start position of image data, the position where the first beam 200a forms an image on the photosensitive surface 300 is determined as a reference position P1.

The second beam 200b is reflected by the half-silvered mirror 50 to travel in a direction that is substantially perpendicular to the optical axis A.X of the scanning optical system 30 and then enters the BD sensor 40. The optical scanning device 1 starts writing image data on the photosensitive surface 300 after the lapse of a predetermined time period from the detection of the second beam 200b by the BD sensor 40. On condition that the light beam 200 is not deviated from the reference for determining the write start position of image data, writing of image data starts from a write start position P2 and ends at a write end position P3.

In the case where the detection timing of the second beam 200b by the BD sensor 40 is deviated from the reference, the write start timing of image data to the photosensitive surface 300 by the optical scanning device 1 deviates. This leads to that the write start position of image data on the photosensitive surface 300 deviates from the write start position P2. As a consequence, deviation is caused in the image formed on paper to reduce the image quality.

To reduce or prevent deviation of the write start position of image data on the photosensitive surface 300, the timing with which the first beam 200a forms an image on the photosensitive surface 300 is synchronized with the timing with which the BD sensor 40 detects the second beam 200b. That is, the BD sensor 40 is positioned relative to the casing so as to synchronize the detection of the second beam 200b by the BD sensor 40 with the timing of the image formation on the photosensitive surface 300 by the first beam 200a.

Figure 2:
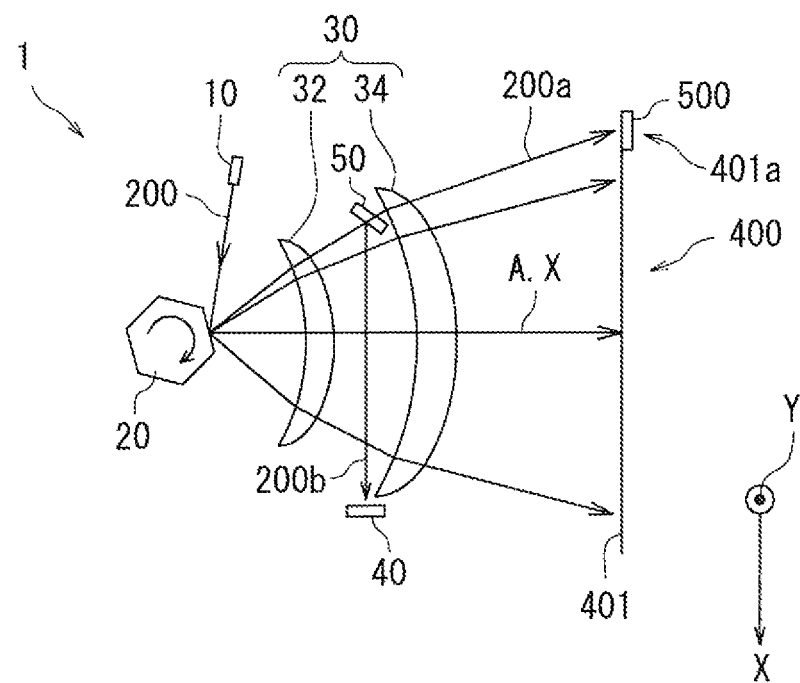
FIG. 2 illustrates a method for positioning a BD sensor relative to a casing according to the first embodiment.
Figure 3:
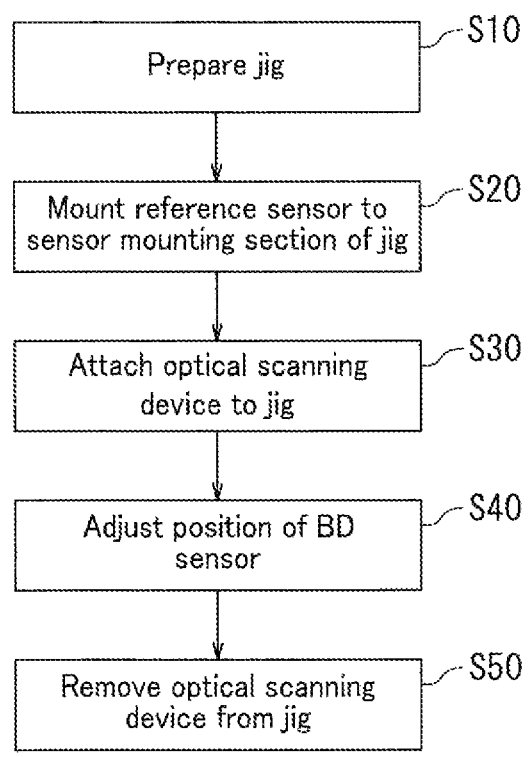
FIG. 3 is a flowchart of the method for positioning the BD sensor relative to the casing according to the first embodiment.

The positioning of the BD sensor 40 relative to the casing is carried out in the manufacturing process of the optical scanning device 1. The following describes the method for positioning the BD sensor 40 relative to the casing, with reference to FIGS. 2 and 3. FIG. 2 illustrates the method for positioning the BD sensor 40 relative to the casing. FIG. 3 is a flowchart of the method for positioning the BD sensor 40 to the casing.

As shown in FIG. 2, a jig 400 is used for positioning the BD sensor 40 relative to the casing. The jig 400 has a sensor mounting surface 401. The sensor mounting surface 401 is placed relative to the optical scanning device 1 so as to coincide with the position where the photosensitive surface 300 (see FIG. 1) is to be placed. The sensor mounting surface 401 is provided with a sensor mounting section 401a. The sensor mounting section 401a is disposed at a reference position where the first beam 200a should enter. Note that the reference position mentioned here is a position in the sensor mounting surface 401 where the first beam 200a enters, on condition that the first beam 200a is not deviated from the reference for determining the write start position of image data.

The position of the BD sensor 40 relative to the casing is determined with the use of the jig 400 in the following manner. As shown in FIG. 3, first, a worker prepares the jig 400 in Step S10.

Next, in Step S20, the worker mounts a reference sensor 500 to the sensor mounting section 401a of the jig 400. The reference sensor 500 detects the first beam 200a entering the sensor mounting surface 401.

Next, in Step S30, the worker attaches the optical scanning device 1 to the jig 400.

Next, in Step S40, the worker adjusts the position of the BD sensor 40. More specifically, the worker turns on the light source 10 and observes the waveform of the first beam 200a detected by the reference sensor 500 and the waveform of the second beam 200b detected by the BD sensor 40 on an oscilloscope or the like. Then, the worker adjusts the position of the support member of the BD sensor 40 so as to synchronize the detection timing of the second beam 200b by the BD sensor 40 with the detection timing of the first beam 200a by the reference sensor 500. Then, the worker secures the support member to the casing with a screw.

Next, in Step S50, the worker removes the optical scanning device 1 from the jig 400.

By adjusting the position of the BD sensor 40 as described above, the detection timing of the first beam 200a by the reference sensor 500 can be synchronized with the detection timing of the second beam 200b by the BD sensor 40, despite that the incident angle or position of the light beam 200 on the polygon mirror 20 deviates from the reference. This can consequently reduce or prevent deviation of the timing for the optical scanning device 1 to start wiring image data to the photosensitive surface 300 (see FIG. 1) and thus reduce or prevent reduction of the image quality.

In the case of an optical scanning device including a reflecting mirror instead of the half-silvered mirror 50, the write start timing of image data to the photosensitive surface 300 (see FIG. 1) deviates when the incident angle or position of the light beam 200 on the polygon minor 20 deviates from the reference. The reason is described with reference to FIGS. 4-6.

Figure 4:
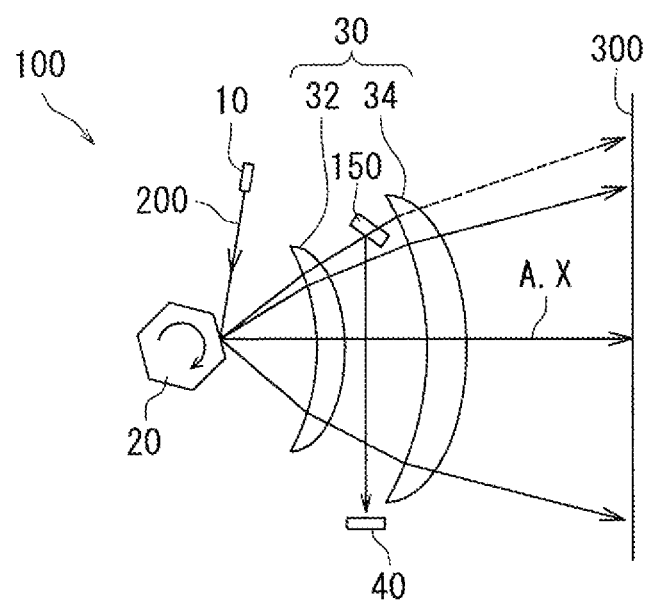
FIG. 4 is a schematic diagram of an optical scanning device of a comparative example.

FIG. 4 is a schematic diagram of an optical scanning device 100 of a comparative example. In FIG. 4, components of the optical scanning device 100 that are similar to those of the optical scanning device 1 shown in FIG. 1 are denoted by the same reference signs. The optical scanning device 100 includes a reflecting mirror 150, instead of the half-silvered mirror, between the scan lenses 32 and 34. The reflecting mirror 150 changes the traveling direction of the light beam 200 so as to guide the light beam 200 to the BD sensor 40.

In an optical system having an object point at infinity (parallel light incidence), suppose that the aberration of a scanning optical system is appropriately corrected. Then, when two light beams are incident on the scanning optical system at the same angle, there is substantially no difference between the heights of images formed by the respective light beams despite a minute difference in the incident positions.

Consequently, there may be a case where the image forming point of the light beam 200 on the photosensitive surface 300 does not deviate from the reference although the incident angle or position of the light beam 200 on the polygon minor 20 deviates from the reference.

Figure 5A:
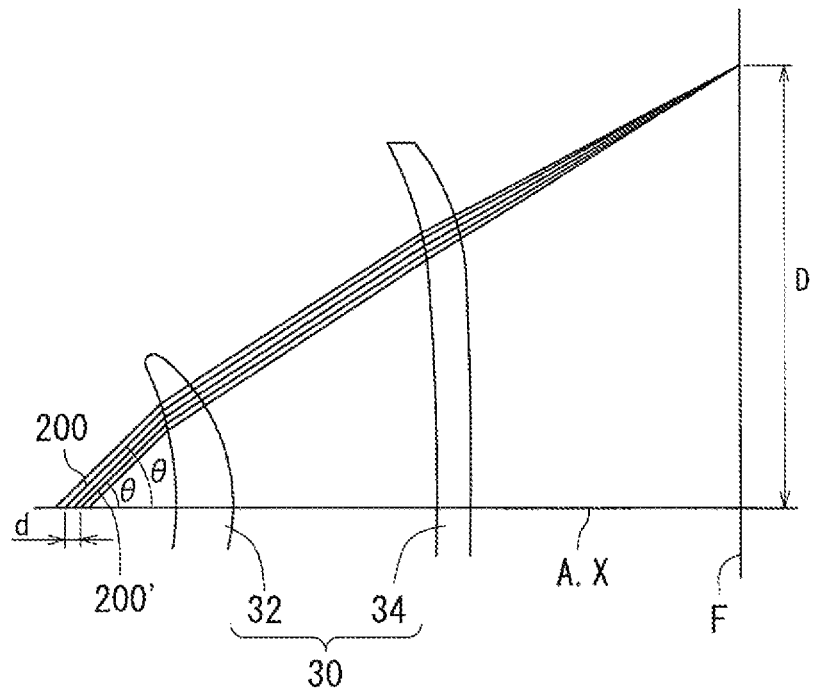
FIG. 5A illustrates, with respect to the optical scanning device of the comparative example, a relation between an incident position of each of two parallel light beams on a scanning optical system and an image forming position of each light beam on a laser image plane in a case where both of the two parallel light beams pass through a second scan lens.
Figure 5B:
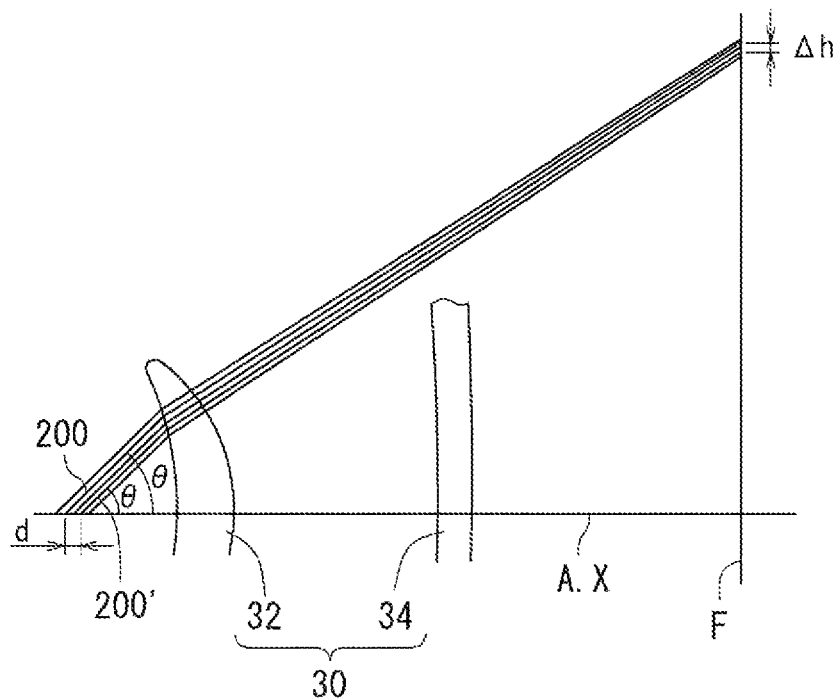
FIG. 5B illustrates, with respect to the optical scanning device of the comparative example, a relation between an incident position of each of two parallel light beams on the scanning optical system and an image forming position of each light beam on the laser image plane in a case where neither of the two parallel light beams pass through the second scan lens.

FIGS. 5A and 5B each illustrate, with respect to the optical scanning device of the comparative example, a relation between an incident position of each of two parallel light beams 200 and 200' on the scanning optical system 30 and an image forming position of each light beam on a laser image plane F. FIG. 5A shows the case where both the light beams 200 and 200' pass through the scan lens 34, whereas FIG. 5B shows the case where neither of the light beams 200 and 200' pass through the scan lens 34.

In FIG. 5A, the light beams 200 and 200' enter the scan lens 32 at the same incident angle (A) and pass through the scan lens 34 to form an image on the laser image plane F. The light beam 200 is deviated from the light beam 200' by the distance d along the optical axis A.X of the scanning optical system 30. Yet, on the laser image plane F, the distance from the image forming position of the light beam 200 to the optical axis A.X and the distance from the image forming position of the light beam 200' to the optical axis A.X are both equal to the distance D. Consequently, the height of the image formed by the light beam 200 is equal to that by the light beam 200'.

On the other hand, in FIG. 5B, the light beams 200 and 200' are not converged by the scan lens 34. Therefore, on the laser image plane F, the image forming position of the light beam 200 deviates from the image forming position of the light beam 200' by $\Delta h$. Consequently, the height of the image formed by the light beam 200 differs from the height of the image formed by the light beam 200'.

In the optical scanning device 100 shown in FIG. 4, when the light beams 200 and 200' enter the BD sensor 40, the respective light beams 200 and 200' form images on the BD sensor 40 in the state as shown in FIG. 5B. That is, since the light beams 200 and 200' do not pass through the scan lens 34, the image forming point of the light beam 200 on the BD sensor 40 is deviated from that of the light beam 200' by $\Delta h$.

Therefore, in the optical scanning device 100 shown in FIG. 4, when the light beam 200 deviates from the reference position and thus regarded to be the light beam 200', the image forming position of the light beam 200' on the BD sensor 40 deviates from the reference position although the image forming position of the light beam 200' on the photosensitive surface 300 does not deviate from the reference position. In that case, the detection timing of the light beam 200' by the BD sensor 40 deviates from the reference. Therefore, when the optical scanning device 100 starts writing image data on the photosensitive surface 300 after the lapse of a predetermined time period from the detection of the second beam 200' by the BD sensor 40, the write start position of the image data deviates from the reference position.

Figure 6:
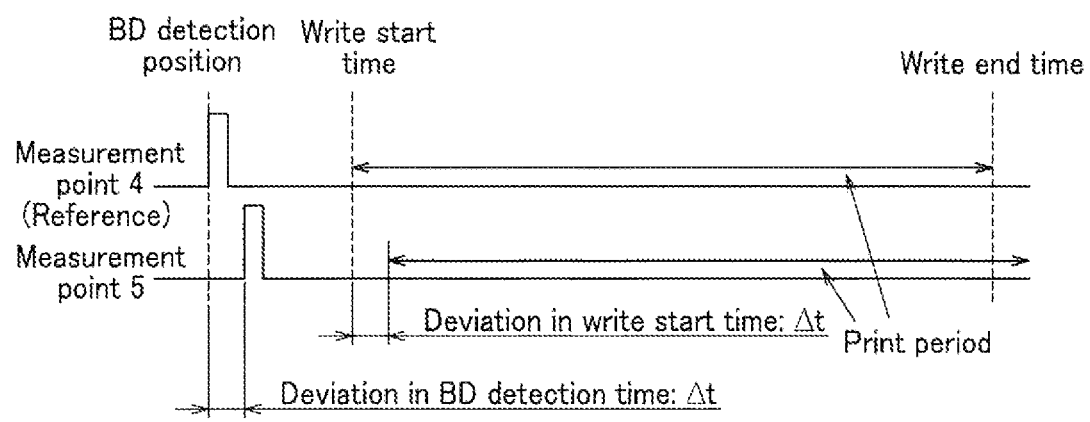
FIG. 6 illustrates, with respect the optical scanning device of the comparative example, deviation in the write start timing of image data to a photosensitive surface.

FIG. 6 illustrates the deviation in the write start time of image data to the photosensitive surface. The deviation in the write start time of image data is caused by the deviation in the detection timing of the light beam by the BD sensor. The measurement timing of the light beam at the measurement point 4 corresponds to the case where the image forming position of the light beam on the BD sensor is not deviated from the reference position. The measurement timing of the light beam at the measurement point 5 corresponds to the case where the image forming position of the light beam on the BD sensor deviates from the reference position by $\Delta h$ (see FIG. 5B). The measurement timing at the measurement point 5 deviates from the measurement timing at the measurement point 4 by $\Delta t$ that corresponds to $\Delta h$.

At the measurement point 5, when the optical scanning device starts writing image data to the photosensitive surface after the lapse of a predetermined time period from the detection of the light beam by the BD sensor, the write start time of image data to the photosensitive surface deviates from the reference time by $\Delta t$. This results in degradation of image quality.

On the other hand, the optical scanning device 1 according to the present embodiment includes the half-silvered mirror 50 instead of a reflecting mirror and adjusts the position of the BD sensor 40 so as to synchronize the detection timing of the second beam 200b by the BD sensor 40 with the detection timing of the first beam 200a by the reference sensor 500. Consequently, the deviation in the write start timing of image data to the photosensitive surface 300 (see FIG. 1) can be reduced or prevented and thus reduction of the image quality can be reduced or prevented.

Figure 7:
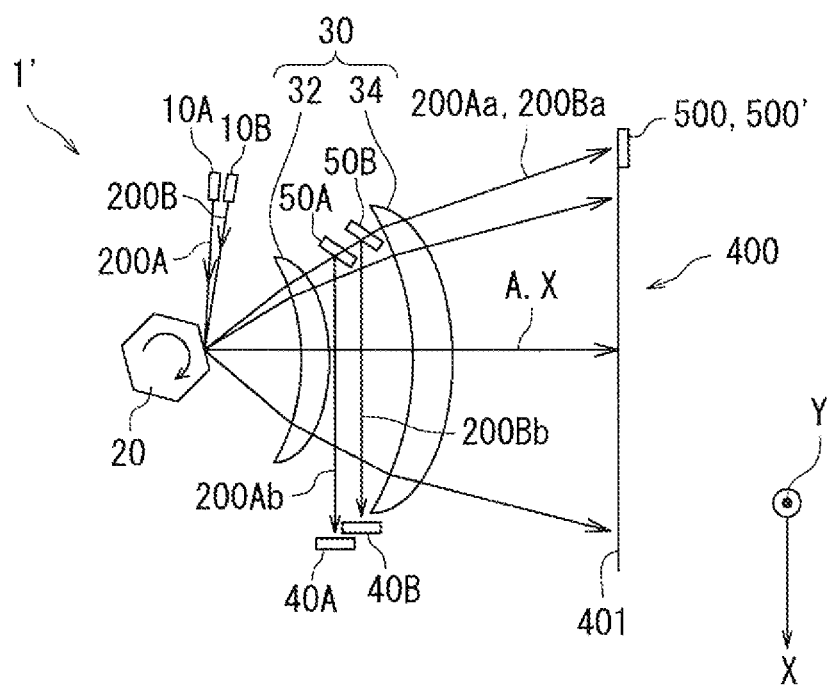
FIG. 7 is a schematic diagram of an optical scanning device according to a second embodiment of the present disclosure.

Next, the following describes a second embodiment of the present disclosure. FIG. 7 is a schematic diagram of an optical scanning device according to the second embodiment of the present disclosure. In the second embodiment, components corresponding to those of the first embodiment shown in FIGS. 1 and 2 are denoted by the same reference signs, and no overlapping description is given.

An optical scanning device 1' according to the second embodiment includes: a pair of light sources 10A and 10B; a BD sensor 40A and a half-silvered mirror 50A both of which are provided for the light source 10A; and a BD sensor 40B and a half-silvered mirror 50B both of which are provided for the light source 10B.

The light source 10A emits a light beam 200A. The half-silvered mirror 50A splits the light beam 200A into a first beam 200Aa and a second beam 200Ab. The first beam 200Aa passes through the half-silvered mirror 50A and a scan lens 34 to enter a sensor mounting surface 401. The second beam 200Ab is reflected by the half-silvered mirror 50A to enter the BD sensor 40A.

The light source 10B emits a light beam 200B. The half-silvered mirror 50B splits the light beam 200B into a first beam 200Ba and a second beam 200Bb. The first beam 200Ba passes through the half-silvered mirror 50B and the scan lens 34 to enter the sensor mounting surface 401. The first beam 200Ba enters at a position that is away from the first beam 200Aa in the sub-scanning direction (in the Y-axis direction of FIG. 4). The second beam 200Bb is reflected by the half-silvered mirror 50B to enter the BD sensor 40B.

Figure 8A:
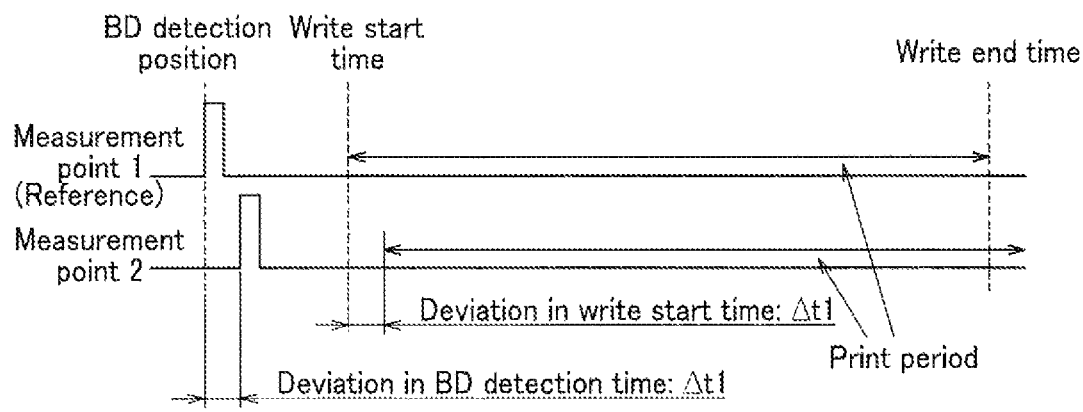
FIGS. 8A and 8B each illustrate, with respect to the second embodiment, deviation in the write start timing of image data to a photosensitive surface.
Figure 8B:
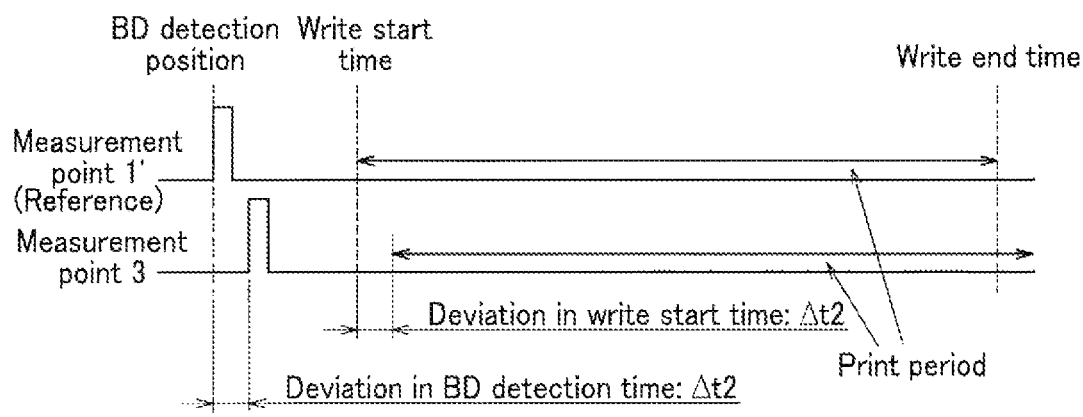

FIGS. 8A and 8B each illustrate deviation in the write start timing of image data to the photosensitive surface. In FIGS. 8A and 8B, the deviation in the write start timing of image data is caused by the deviation in the detection timing of light beam by the BD sensor 50A and the detection timing of light beam by the BD sensor 50B.

With reference to FIG. 8A, the measurement timing at the measurement point 1 indicates the measurement timing of the first beam 200Aa by a reference sensor 500, and the measurement timing at the measurement point 2 indicates the measurement timing of the second beam 200Ab by the BD sensor 40A. Suppose that the measurement timing at the measurement point 2 is deviated from the measurement timing at the measurement point 1 by $\Delta t1$. In this case, when the optical scanning device 1' starts writing image data to the photosensitive surface after the lapse of a predetermined time period from the detection of the second beam 200Ab by the BD sensor 40A, the write start timing of image data to the photosensitive surface deviates from the reference by $\Delta t1$.

With reference now to FIG. 8B, on the other hand, the measurement timing at the measurement point 1' indicates the measurement timing of the first beam 200Ba by a reference sensor 500' that is placed at a position away from the reference sensor 500 in the sub-scanning direction (Y-axis direction), and the measurement timing at the measurement point 3 indicates the measurement timing of the second beam 200Bb by the BD sensor 40B. Suppose that the measurement timing at the measurement point 3 is deviated from the measurement timing at the measurement point 1' by $\Delta t2$. In this case, when the optical scanning device 1' starts writing image data to the photosensitive surface after the lapse of a predetermined time period from the detection of the second beam 200Bb by the BD sensor 40B, the write start timing of image data to the photosensitive surface deviates from the reference by $\Delta t2$.

The method for adjusting the position of the BD sensor 40A is the same as the method for adjusting the BD sensor 40 according to the first embodiment. That is to say, the position of the BD sensor 40A is adjusted so as to synchronize the detection timing of the second beam 200Ab by the BD sensor 40A with the detection timing of the first beam 200Aa by the reference sensor 500. In other words, the position of the BD sensor 40A is adjusted so as to make $\Delta t1$ shown in FIG. 8A equal to 0.

The position of the BD sensor 40B may be adjusted by the same method as the position adjustment of the BD sensor 40A or may be adjusted with reference to the BD sensor 40A.

To adjust the position of the BD sensor 40B by the same method as the position adjustment of the BD sensor 40A, the position of the BD sensor 40B is adjusted so as to synchronize the measurement timing of the second beam 200Bb by the BD sensor 40B with the measurement timing of the first beam 200Ba by the reference sensor 500'. In other words, the position of the BD sensor 40B is adjusted so as to make $\Delta t2$ shown in FIG. 8B equal to 0.

On the other hand, to adjust the position of the BD sensor 40B with reference to the BD sensor 40A, the following is carried out. That is, first, the process of adjusting the position of the BD sensor 40A is carried out, and then the process of adjusting the position of the BD sensor 40B is carried out so as to synchronize the measurement timing of the second beam 200Bb by the BD sensor 40B with the measurement timing of the second beam 200Ab by the BD sensor 40A.

With respect to an optical scanning device having a plurality of light sources, the present embodiment can reduce or prevent that the write start timing of image data deviates among the light sources and thus can reduce or prevent reduction of the image quality.

Note that a color image forming apparatus is provided with a plurality of optical scanning devices, one for each of color of magenta, cyan, yellow, and black, for example. Therefore, deviation in the write start timing of image data on the photosensitive surface among the optical scanning devices results in deviation in the write start timing of image data in the respective colors. In such a case, under the influence of the linearity of the fθ lens in the main scanning direction, the color images suffer from the positional deviation in the main scanning direction, leading to reduction of the image quality.

The present disclosure can reduce or prevent deviation in the write start timing of image data among a plurality of optical scanning devices. More specifically, the plurality of optical scanning devices are mounted to the jig one by one to adjust the position of the BD sensor of the corresponding optical scanning device. As a consequence, deviation in the write start timing of image data among the plurality of optical scanning devices can be reduced or prevented. In the case where the plurality of optical scanning devices form images of mutually different colors, the positional deviation among the images of the respective colors can be reduced or eliminated. Consequently, color images are formed with high accuracy.

Up to this point, the specific embodiments of the present disclosure have been described. However, the present disclosure is not limited to the embodiments shown in FIGS. 1-3, 7, and 8, and various alterations may be made to the present embodiment without departing from the gist of the present disclosure.

For example, the first and second embodiments are directed to the case where the light beam guide is a half-silvered mirror. However, the light beam guide (a prism, for example) other than the half-silvered mirror may be used.

Furthermore, the first embodiment is directed to the case where one light source, one light beam sensor, and one light beam guide are included, and the second embodiment is directed to the case where two light sources, two light beam sensors, and two light beam guides are included. However, three or more light sources, three or more light beam sensors, and three or more light beam guides may be included.

Furthermore, the first and second embodiments are both directed to the case where the scanning optical system includes a first scan lens and a second scan lens. However, the scanning optical system may include three or more scan lenses or only one scan lens. In the case where the scanning optical system includes three or more scan lenses, the first beam may enter the target surface after passing through one of the scan lenses or two or more of the scan lenses.

In addition to alterations mentioned above, various other alterations may be made to the embodiments described above without departing from the gist of the present disclosure.

What is claimed is:

1. An optical scanning device for scanning a target surface with a light beam to write image data on the target surface, the optical scanning device comprising:
    a light source configured to emit the light beam;
    a deflector configured to deflect the emitted light beam;
    a scanning optical system including one or more scan lenses and configured to cause the deflected light beam to form an image on the target surface;
    a light beam sensor configured to detect the light beam; and
    a light beam guide configured to split the light beam into a first beam and a second beam, wherein
    the light beam guide guides the first beam and the second beam so that
        the first beam passes through at least one of the one or more scan lenses to enter the target surface and
        the second beam enters the light beam sensor,
    the light beam sensor is positioned at such a position that timing of detection of the second beam by the light beam sensor is synchronized with timing of image formation by the first beam on the target surface,
    when the deflector deflects the emitted light beam as a reference light beam toward one direction, the light beam guide splits the reference light beam into the first beam that travels to enter the target surface and the second beam that travels to enter the light beam sensor,
    when the deflector deflects the emitted light beam as a write light beam toward another direction, the scanning optical system causes the write light beam to travel without passing through the light beam guide to form the image on the target surface, and the optical scanning device further comprises:

a reference sensor configured to detect the first beam; and a jig having a sensor mounting surface to which the reference sensor is mounted, the sensor mounting surface being placed at a position coinciding with where the target surface is to be placed.

2. An optical scanning device according to claim 1, wherein the scanning optical system includes a first scan lens and a second scan lens, the light beam guide is disposed between the first scan lens and the second scan lens and splits the light beam having passed through the first scan lens into the first beam and the second beam, the first beam passes through the second scan lens to enter the target surface, and the second beam passes between the first scan lens and the second scan lens to enter the light beam sensor.

3. An optical scanning device according to claim 1, comprising:

a plurality of the light sources, and a plurality of the light beam sensors and a plurality of the beam guides for the respective light sources.

4. An optical scanning device according to claim 1, wherein the light beam guide is a half-silvered mirror.

5. An optical scanning device according to claim 1, wherein the target surface is a surface of a photosensitive drum that is included in an image forming apparatus.

6. An optical scanning device according to claim 1, wherein the light beam guide includes a prism.

7. An optical scanning device according to claim 1, further comprising:

a support member that secures the light beam sensor; and a casing that secures the support member, wherein the support member is secured to the casing by a screw.

8. An optical scanning device according to claim 7, wherein the support member has a slot that receives a shaft of the screw so as to allow the support member to move in a longitudinal direction of the slot.

9. An optical scanning device according to claim 1, wherein the light beam sensor is positioned at such a position that timing of detection of the second beam by the light beam sensor is synchronized with timing of detection of the first beam by the reference sensor.

* * * * *